United States Patent [19]

McGinness et al.

[11] Patent Number: 5,776,351

[45] Date of Patent: *Jul. 7, 1998

[54] METHOD FOR REGENERATION AND CLOSED LOOP RECYCLING OF CONTAMINATED CLEANING SOLUTION

[76] Inventors: Michael P. McGinness, 2710 S. Shaver, Unit D, Pasadena, Tex. 77502; Warren Short, 5102 Washington Ave., Houston, Tex. 77007

[*] Notice: The term of this patent shall not extend beyond the expiration date of Pat. No. 5,593,598.

[21] Appl. No.: 721,212

[22] Filed: Sep. 26, 1996

Related U.S. Application Data

[63] Continuation-in-part of Ser. No. 230,346, Apr. 20, 1994, Pat. No. 5,593,598.

[51] Int. Cl.[6] .................................................. C02F 1/78
[52] U.S. Cl. ........................... 210/748; 210/760; 134/10; 134/13; 205/688; 205/695; 205/756
[58] Field of Search ............................ 210/748, 760; 134/10, 13; 205/688, 695, 756

[56] References Cited

U.S. PATENT DOCUMENTS

| 662,509 | 11/1900 | Van Den Brock | 210/760 |
|---|---|---|---|
| 767,195 | 8/1904 | Zerbe | 210/760 |
| 799,605 | 9/1905 | Lester | 210/760 |
| 3,546,114 | 12/1970 | Dietz et al. | 134/10 |
| 4,436,643 | 3/1984 | Bürger et al. | 134/10 |
| 4,609,488 | 9/1986 | Geke et al. | 134/10 |
| 5,409,616 | 4/1995 | Garbutt et al. | 210/760 |
| 5,593,598 | 1/1997 | McGinness et al. | 210/748 |

FOREIGN PATENT DOCUMENTS

| 166999 | 12/1981 | Japan | 210/760 |
|---|---|---|---|
| 264133 | 11/1988 | Japan | 210/760 |

*Primary Examiner*—Neil McCarthy
*Attorney, Agent, or Firm*—Kenneth A. Roddy

[57] ABSTRACT

An oxidation process for regeneration and closed loop recycling of cleaning solutions contaminated with used surfactants, fats, oils, greases, and inorganic and organic contaminants converts the contaminated cleaning solution into a reusable cleaning solution containing useful polar water soluble surfactants, detergents, wetting agents and emulsifiers. The contaminated cleaning solution is mixed with a stoichiometrically limited amount of an ozone containing gas. The reaction with ozone containing gas is carried out in a mixed vapor state (a gas/liquid mist). Fats, oils, greases and organic contaminants are converted into useful polar water soluble surfactants, detergents, wetting agents and emulsifiers. The regenerated cleaning solution has a cleaning strength at least as great as the strength of the original cleaning solution prior to contamination. The regenerated cleaning solution is reused as the cleaning solution in the original cleaning process from which the contaminated cleaner was obtained. The rinse water in the cleaning process becomes contaminated with dilute reused regenerated cleaning solution and is recycled by reverse osmosis to separate the rinse water and reconcentrate the reused cleaning solution. The reconcentrated reused cleaning solution is returned to the original cleaning process for reuse and the reverse osmosis product water is returned to the original rinse station for reuse.

17 Claims, 3 Drawing Sheets

METHOD FOR REGENERATION AND CLOSED LOOP RECYCLING OF CONTAMINATED CLEANING SOLUTION

This application is a continuation-in-part of U.S. patent application Ser. No. 08/230,346, filed Apr. 20, 1994, now U.S. Pat. No. 5,593,598.

BACKGROUND OF THE INVENTION

1. Field of the Invention

This invention relates generally to oxidation processes, and more particularly to a method for regeneration and closed loop recycling of contaminated cleaning solutions by mixing the contaminated cleaning solution with a stoichiometrically limited amount of an ozone containing gas and recycling the rinse water and cleaning solution dragged into the rinse water using a reverse osmosis means to separate the rinse water and reconcentrate the cleaning solution prior to returning them to the original cleaning process.

2. Brief Description of the Prior Art

Industrial cleaning processes are currently being reevaluated and redesigned in order to minimize the amount of waste produced and the resulting cost of waste disposal. Waste disposal costs have soared in recent years, and there is increasing pressure from Congress, and the public to reduce the amount and the toxicity of all industrial waste streams.

Aqueous cleaning formulations used in spray washers are frequently quoted as being environmentally safe and biodegradable. However, when they are exhausted and ready for disposal they will always contain the contaminants that were removed from the dirty parts. Automotive contaminants include motor oil, transmission fluid, benzene, lead, cadmium and the used cleaning solution often includes organic compounds from other cleaning processes that are dragged in on the parts which have been cleaned, such as carburetor cleaner. These compounds include phenol, benzene, creosols, xylenes, chlorinated hydrocarbons and various paint solvents. Most of these compounds are now on the EPA's new "TCLP" hazardous waste list. Waste cleaners frequently leach more than the limit of these organic compounds and are therefore considered to be hazardous wastes.

In the past, disposing of weak contaminated cleaners and replacing them with fresh cleaners has been the most cost-effective option. Replacing a cleaning bath requires shutting down the cleaning process, draining out the old cleaner, and filling the tank with the new cleaner. Then the old cleaner must be tested and disposed of properly. Testing and disposal costs have soared in recent years.

It would therefore be desirable to extend the useful life of cleaning solutions. Mechanical filters, oil skimmers and special oil releasing cleaning formulas are becoming quite common. None of these methods has eliminated the need for continued frequent disposal of used cleaning solutions. Solvent based cleaners can be distilled and reused. However, they tend to be flammable, sources of air pollution, odorous, or depleters of the ozone layer. There is a major shift underway from hazardous solvent based cleaners to aqueous based cleaning products. Products are commercially available to separate oils and greases from cleaning solutions to help increase the life of the cleaning bath. However, these products do not eliminate the eventual need for disposal of the contaminated oil or the spent cleaning solution. Some facilities have switched to very expensive burn-off ovens to burn off the oils and greases, followed by dry shot blasting. This method is extremely energy intensive and costly, and is not usable on plastic or aluminum.

2

Industries which generate waste must determine if their used cleaning wastes are hazardous before disposing of them. A complete lab analysis of just one waste stream can cost from $2,000 to $3,000.00 and disposal costs for hazardous waste vary from $300.00 to $1,200.00 per barrel. Even when the waste has been properly disposed of, the waste generator remains forever liable for any future problems caused by the waste.

The U.S. Environmental Protection Agency (EPA) now requires hazardous waste generators to certify on their hazardous waste manifests that the amount of hazardous waste produced has been minimized prior to shipping the waste. One current method is to boil the water off and ship the solids. This is one of the most energy intensive and costly methods available. Systems that boil 50 gallons/day can cost over $10,00.00 to purchase. They tend to scale easily, thus, reducing their energy efficiency and they do not solve the problem of solids disposal.

Another disposal option is to set up and man a small scale waste water treatment and neutralization system. This option requires trained operators, more chemicals, the energy required to pump and filter the solution prior to discharge, and a permit to discharge the treated waste water. These systems also produce large volumes of wet sludge requiring further treatment prior to disposal.

Chlorinated solvents are rapidly being phased out and replaced by aqueous cleaners in order to avoid the new ozone-depletion product-labeling law. This new law requires manufactures to label products which have been cleaned with ozone depleting chemicals as having been manufactured with an ozone depleting chemical. These solvents are being heavily taxed and considering waste disposal costs and cradle to grave liability issues, they are no longer cost effective. These market forces are driving industry to replace solvent cleaners with aqueous cleaners.

The following U.S. Patents and publications are discussed as further background and also as an information disclosure reviewing past attempts to solve the problems outlined above.

U.S. Pat. Nos. 3,149,906 and 4,212,330 discloses methods for treating animal fibers with gaseous ozone and steam wherein the ozone and steam mixture is used to shrink-proof proteinous animal fibers. U.S. Pat. No. 5,097,556 discloses a laundry waste water treatment and wash process using only ozone as the bleaching and disinfecting means and specifically excludes the use of any cleaning additives to the wash water other than ozone. The washing and ozone treatment are both ambient cold temperature processes and pertain to bleaching and disinfecting of laundry with cold detergent free rinse water. The rinse water is recycled using ozone and course mechanical filters. The bleaching, disinfecting, and cleaning are accomplished by rinsing with cold water containing ozone.

Deitz, U.S. Pat. No. 3,546,114 discloses a process for sterilizing industrial waste water at temperatures above 160° F. to "commercially sterilize" the waste rinse water before reuse in rinsing new food containers and prior to packaging food in the rinsed containers. The process requires first filtering the waste water and then introducing ozone in an amount sufficient to "completely destroy all organic soap residues" in the waste water in addition to sterilizing the water to the point of being "suitable for human consumption".

The present process is distinguished over the Deitz process in that the present process treats contaminated cleaning solutions contaminated with contaminants such as diesel oils, motor oils, baked on grease, fats, oils, greases, and many other inorganic and organic contaminants. The present process uses a stoichiometrically limited amount of an ozone containing gas sufficient to partially oxidize the organic compounds without complete destruction of the organic compounds and the partially oxidized organic compounds in the used cleaner and reduce the surface tension of the used cleaning solution, thereby improving its cleaning ability. The present process does not initially filter the cleaning solution, and does not sterilize the cleaning solution or completely destroy soap residues, nor is it desirable in the present process. Moreover, the liquids in the present process are never fit for human consumption.

U.S. Pat. No. 4,076,617 discloses a process for purifying waste material using a combination of ozone and ultrasonics.

U.S. Pat. Nos.: 3,746,756; 4,242,309; 4,185,025; 5,015,760; 5,103,061; 3,862,142; 4,404,110; 3,658,667; 3,637,721; and 4,181,652; all relate to chemically manufacturing very specific compounds by reacting other very specific raw material compounds with ozone under very specific conditions. None of them suggest producing a reusable cleaning solution out of the contaminants dragged into the cleaning solution.

All of the references listed above related to either purifying and/or disinfecting waste water or to producing a completely different product.

The present invention is distinguished over the prior art in general, and these patents in particular by an oxidation process for regeneration and closed loop recycling of cleaning solutions contaminated with used surfactants, fats, oils, greases, and inorganic and organic contaminants which converts the contaminated cleaning solution into a reusable cleaning solution containing useful polar water soluble surfactants, detergents, wetting agents and emulsifiers. The contaminated cleaning solution is mixed with a stoichiometrically limited amount of an ozone containing gas. The reaction with ozone containing gas is carried out in a mixed vapor state (a gas/liquid mist). Fats, oils, greases and organic contaminants are converted into useful polar water soluble surfactants, detergents, wetting agents and emulsifiers. The regenerated cleaning solution has a cleaning strength at least as great as the strength of the original cleaning solution prior to contamination. The regenerated cleaning solution is reused as the cleaning solution in the original cleaning process from which the contaminated cleaner was obtained. The rinse water in the cleaning process becomes contaminated with dilute reused regenerated cleaning solution and is recycled by reverse osmosis to separate the rinse water and reconcentrate the reused cleaning solution. The reconcentrated reused cleaning solution is returned to the original cleaning process for reuse and the reverse osmosis product water is returned to the original rinse station for reuse.

Because the regenerated cleaning solution has a cleaning strength at least as great as the strength of the original cleaning solution prior to contamination, the present process permits the continued use of a cleaning solution long after it would have been dumped using previously known methods. Since the organic soils are converted from contaminants to cleaning compounds the need for frequent bath dumps is totally eliminated. Furthermore, the regenerated cleaning solution frequently cleans more thoroughly and/or faster than the original cleaning solution. Because oil and grease do not accumulate in the regenerated cleaning solution, reverse osmosis may be used to recover and recycle the cleaner and rinse water from the cleaning process rinse water. The amount of water and chemicals needed to maintain the original cleaning bath is substantially reduced, and the cost of waste disposal is eliminated. The present process also allows the cleaning bath to be maintained at the peak performance of a new bath resulting in decreased cycle times and decreased energy consumption needed to clean the parts. This results in a more efficient and cost effective cleaning process.

SUMMARY OF THE INVENTION

It is therefore an object of the present invention to provide a process for converting contaminated aqueous and organic solvent based cleaning solutions into reusable cleaning solutions using an oxidation means to attain the conversion.

It is another object of this invention to provide a process for converting the contaminants in used contaminated cleaning solutions into useful soluble synthetic surfactants, wetting agents and emulsifiers by reacting the contaminants with a stoichiometrically limited amount of an ozone containing gas.

Another object of this invention is to provide a process for regenerating and recycling rinse water and cleaning solution dragged into the rinse water using reverse osmosis to separate the rinse water and reconcentrate the cleaning solution prior to returning the reconcentrated cleaning solution back to the original cleaning process and prior to returning the separated reusable rinse water back the rinse stations.

Another object of this invention is to provide a process that eliminates the need for occasional disposal and waste treatment of used cleaning solutions and contaminated rinse waters by regenerating and recycling the used cleaning solution and contaminated rinse water.

Another object of this invention is to provide a process for producing and continuously maintaining a regenerated cleaning solution having a cleaning strength at least as great as the strength of the original cleaning solution, prior to contamination, and which is recycled to the original cleaning process whereby the original cleaning process operates faster and more efficiently thereby reducing both the cleaning cycle time and the energy required to maintain the cleaning process.

Another object of this invention is to provide a process for producing and continuously maintaining a regenerated cleaning solution in a cleaning process whereby the regenerated cleaning solution has a cleaning strength at least as great as the strength of the original cleaning solution prior to contamination and which is capable of cleaning at reduced temperatures, as low as 70° F.

Another object of this invention is to provide a process for producing and continuously maintaining a regenerated cleaning solution free of any accumulation of objectionable odors caused by odorous contaminants due to aromatic compounds used in pre-cleaners such as carburetor cleaners and paint strippers.

Another object of this invention is to provide a process for regenerating and recycling contaminated cleaning solutions which eliminates the need for maintenance cleaning of the reverse osmosis means and the resulting waste reverse osmosis cleaning compounds by using the regenerated cleaning solution to simultaneously clean the reverse osmosis means while separating the contaminated rinse water into the regenerated cleaning solution and rinse water prior to returning the regenerated cleaning solution to the original cleaning process and the rinse water to the rinse water station.

Another object of this invention is to provide a process for regenerating and recycling contaminated cleaning solutions which concentrates dry oxygen prior to transporting the dry oxygen to an ozone containing gas generator where the oxygen is partially converted into ozone, thereby increasing the output of the ozone containing gas generator.

Another object of this invention is to provide a process for regenerating and recycling contaminated cleaning solutions which utilizes an ozone containing gas wherein the ozone is generated by a corona discharge, ultraviolet light, or an electrolytic ozone generator which converts a portion of the oxygen in the feed gas into ozone.

A still further object of this invention is to provide a process for regenerating and recycling contaminated aqueous and organic solvent cleaning solutions which is simple and economical to operate.

Other objects of the invention will become apparent from time to time throughout the specification and claims as hereinafter related.

The above noted objects and other objects of the invention are accomplished by an oxidation process for regeneration and closed loop recycling of cleaning solutions contaminated with used surfactants, fats, oils, greases, and inorganic and organic contaminants which converts the contaminated cleaning solution into a reusable cleaning solution containing useful polar water soluble surfactants, detergents, wetting agents and emulsifiers. The contaminated cleaning solution is mixed with a stoichiometrically limited amount of an ozone containing gas. The reaction with ozone containing gas is carried out in a mixed vapor state (a gas/liquid mist). Fats, oils, greases and organic contaminants are converted into useful polar water soluble surfactants, detergents, wetting agents and emulsifiers. The regenerated cleaning solution has a cleaning strength at least as great as the strength of the original cleaning solution prior to contamination. The regenerated cleaning solution is reused as the cleaning solution in the original cleaning process from which the contaminated cleaner was obtained. The rinse water in the cleaning process becomes contaminated with dilute reused regenerated cleaning solution and is recycled by reverse osmosis to separate the rinse water and reconcentrate the reused cleaning solution. Reconcentrated reused cleaning solution is returned to the original cleaning process for reuse and the reverse osmosis product water is returned to the original rinse station for reuse.

DESCRIPTION OF THE PREFERRED EMBODIMENTS

Figure 1:
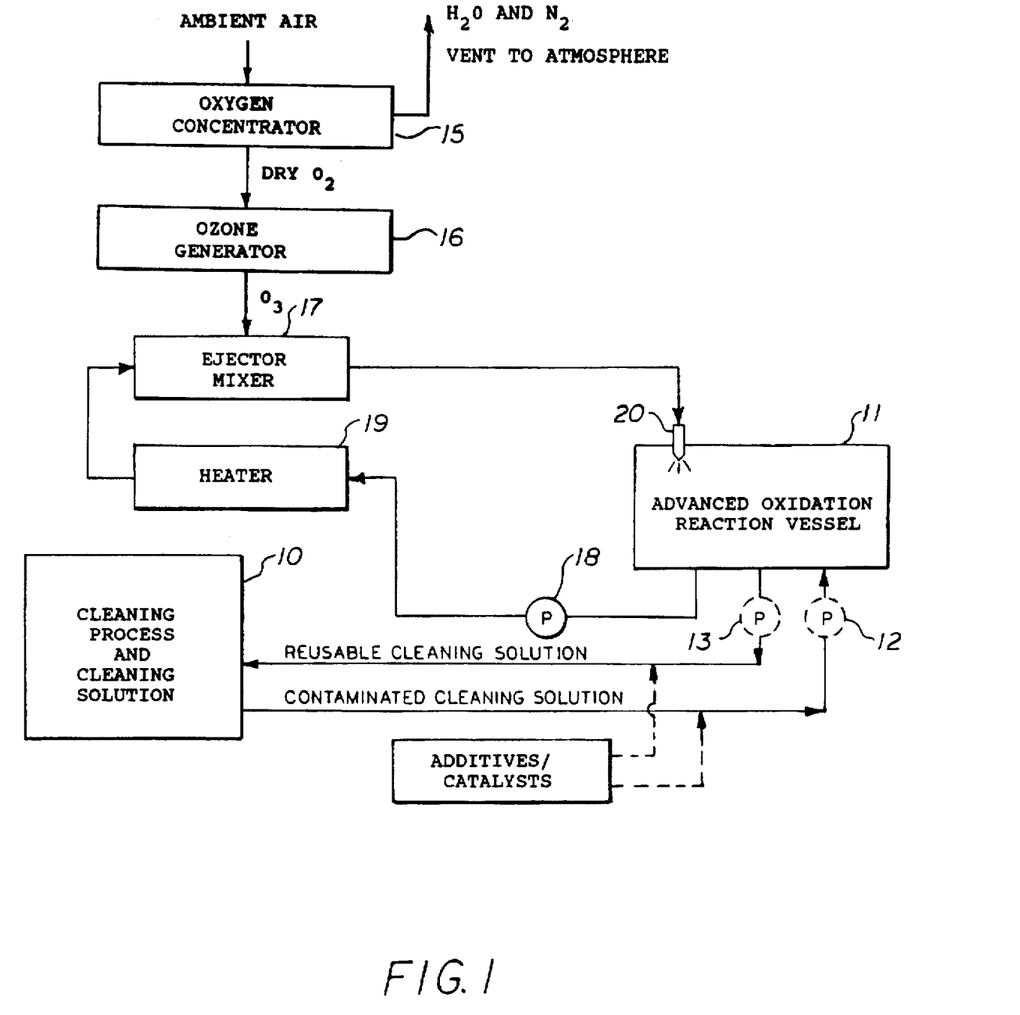
FIG. 1 is a flow diagram of a closed loop oxidation reaction process for converting used contaminated cleaning solutions into regenerated reusable cleaning solutions in accordance with the present invention.

Referring to the drawings by numerals of reference, there is shown in FIG. 1, an oxidation reaction process for regeneration of used contaminated aqueous and organic solvent based cleaning solutions in accordance with the present invention. The contaminated cleaning solution may contain diesel oils, motor oils, baked on grease, water, organic solvents, used surfactants, ionic salts, fats, oils, greases, and inorganic and organic contaminants. The present process partially oxidizes the organic compounds in the contaminated cleaning solution and the partially oxidized organic compounds reduce the surface tension of the used cleaning solution. The process converts the contaminated cleaning solution into a reusable regenerated cleaning solution containing new useful cleaning agents including surfactants, detergents, wetting agents and emulsifiers, formed by the process.

As shown in FIG. 1, a contaminated cleaning solution is transported from an original cleaning process 10 to an oxidation reaction vessel 11 by gravity flow or other suitable means, such as a pump 12. Such a pump may be a sole purpose pump or a split feed from the cleaning process wash pump. The regenerated reusable cleaning solution is transported back to the cleaning process 10 either by gravity flow or by a pump 13, with a gravity flow being preferred. A preferred pump is a conventional sealess electromechanical centrifugal pump suitable for harsh chemical service and temperatures up to the boiling point of the cleaning solution (typically below 220° F.). Other pumps such as air driven positive displacement double diaphragm pumps would also be suitable for this service.

The oxidation reactor vessel 11 may be constructed of heavy wall mild steel, thin wall stainless steel, linear low density polyethylene, polytetraflouroethylene, or other suitable materials. The reactor operates at atmospheric pressure and is therefore not required to be a pressure vessel.

An oxygen concentrator 15 is connected to an ozone generator 16. Oxygen is concentrated in the oxygen concentrator 15 from an atmospheric air feed and then is passed through the ozone generator 16 where the oxygen rich gas is converted into an ozone containing gas. In a preferred embodiment the ozone containing gas is produced in small quantities for small cleaning systems with an ultraviolet light ozone generator where ambient air is drawn through the ozone generator and some of the oxygen in the ambient air is converted to ozone.

Alternatively, the ozone generator 16 may be a corona discharge ozone generator capable of producing larger quantities of ozone more efficiently than with ultraviolet light. A corona discharge ozone generator when fed with concentrated oxygen produces proportionally larger quantities of ozone at higher concentrations. The corona discharge ozone generator embodiment would include the use of a pressure swing adsorption oxygen concentrator to produce and supply concentrated dry oxygen to the corona discharge ozone generator.

The ozone containing gas is drawn from the ozone generator 16 and into the vacuum port of an ejector mixer 17. The ejector mixer 17 generates a vacuum when the contaminated cleaning solution is pumped through the ejector by an ejector feed pump 18. When treating water-based cleaning solutions, the ejector feed pump 18 circulates the contaminated cleaning solution from the reaction vessel 11 to an inline electric heater 19 which heats the solution and then the contaminated cleaning solution is passed through the ejector mixer 17 then through an atomizing nozzle 20 and back into the reactor vessel 11. When treating some non-water based cleaning solutions, the heating step may be eliminated.

The vacuum is produced by the expansion of the contaminated cleaning solution as it passes through the ejector mixer 17. Thus, the ozone containing gas is premixed with the contaminated cleaning solution in the ejector mixer 17 before being atomized into the reactor vessel 11. In some cases, a portion of the cleaning process pump flow may be used to eliminate the need for a separate ejector feed pump.

For example, a cleaning solution containing a total of 30 kg (kilograms of mass) of organic carbon (from oil and grease contaminants) would begin to see a useful effect or improvement in the cleaning performance after reaction with 0.1 kg of ozone (a mass ratio of 300:1). Maximum cleaning performance would be reached at a total feed of approximately 1.0 kg of ozone (30:1). More than about 3.0 kg of ozone feed (a ratio of 10:1) would have a negative effect on the cleaning performance and therefore be undesirable.

Figure 2:
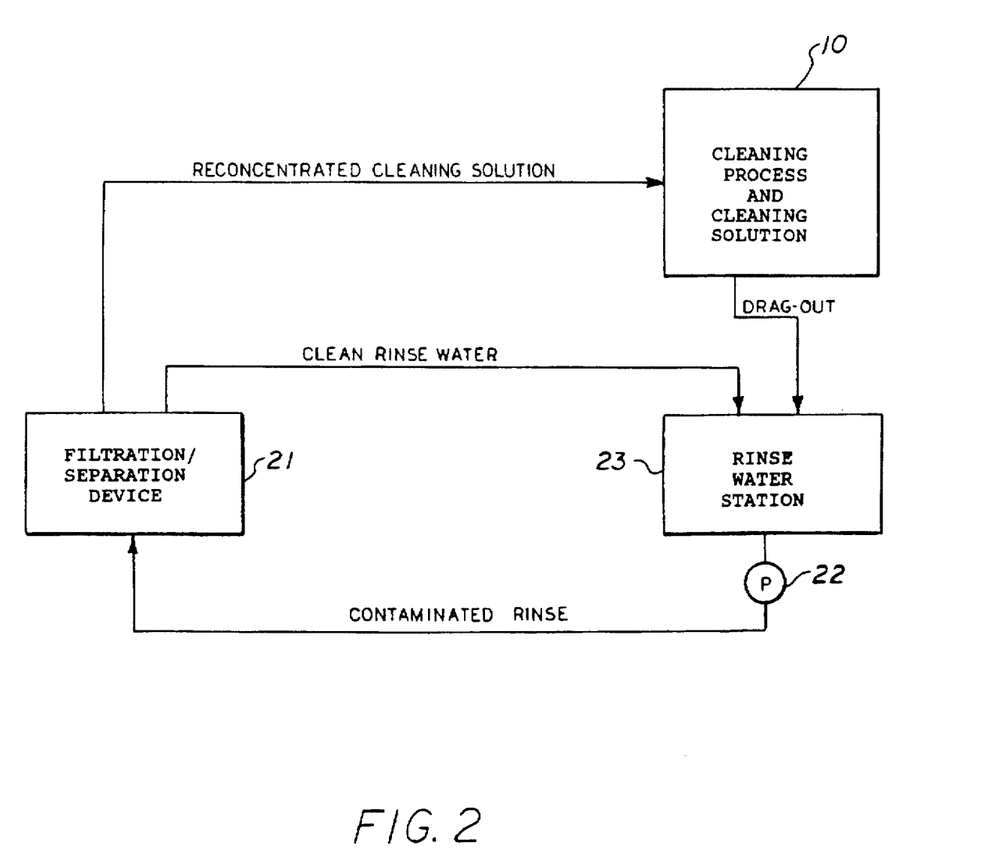
FIG. 2 is a flow diagram of the recyclable rinse water/dilute recyclable cleaning solution mixture, separation, recovery, and recycling stages of the process in accordance with the present invention.

Referring now to FIG. 2, the separation, recovery and recycling stages of the rinse water/dilute regenerated cleaning solution mixture are illustrated by the flow diagram. The "cleaning process and cleaning solution" box 10 of FIG. 2 is the same as the "cleaning process and cleaning solution" box 10 of FIG. 1. The regenerated reusable cleaning solution is returned and utilized as the cleaning solution in the original cleaning process from which the contaminated cleaning solution was obtained. After rinsing in the rinse water station, the rinse water becomes contaminated with dilute regenerated cleaning solution.

The contaminated rinse is transported by a pump 22 to a filtration/separation device 21 such as a reverse osmosis, nano-filtration, or an ultra-filtration apparatus. Separation may also be improved by the addition of other means such as screens, hydrocyclones, filters, precipitation, and gravity. The preferred pump 22 is a high pressure positive displacement pump which is capable of pressures up to 1,000 pounds per square inch. The contaminated rinse is then separated by the filtration/separation device 21 into a reconcentrated regenerated reusable cleaning solution and clean reusable recyclable rinse water. The reconcentrated regenerated reusable cleaning solution is then returned back to the original cleaning process and cleaning solution station 10, and the clean filtered rinse water is returned to the original rinse station 23 for reuse.

In a preferred embodiment the filtration/separation device 21 is a reverse osmosis apparatus having a plurality of reverse osmosis membranes fed by the high pressure positive displacement pump 22. The high pressure pump 22 may serve as the means of feeding the contaminated rinse water to the reverse osmosis membrane apparatus 21 and the means of transporting the reusable regenerated cleaning solution and reusable rinse water back to the original cleaning process 10 and the original rinse station 23, respectively.

Separation by reverse osmosis means is made practical because the contaminants which would otherwise foul the reverse osmosis membranes have been converted by the present process to useful surfactants, wetting agents, detergents and emulsifiers that will actually clean the reverse osmosis membranes while being concentrated in the reverse osmosis membranes.

In some installations, the filtration/separation device 21 is not needed. In this modification, the contaminated rinse water is used as make-up feed water to the cleaning process 10 to replace water lost to evaporation and dragout.

It should be understood, that various steps in the preferred embodiment described in detail herein may be carried out as either batch steps or continuous process steps, and although the invention has been described utilizing tank-type vessels, other types of vessels, such as tube-type or pipeline reactor vessels, may be used in series and/or parallel combinations.

Solution additives may be used to compensate for variations in the amount of contaminate loading on the original cleaning system, variations in the original cleaning solution formula, and for variations in the chemistry of the contaminants themselves.

Additives, oxidation catalysts, and selective catalysts which increase the yield of desired cleaning agents while reducing the amount of ozone required to produce the cleaning agents, may also be added periodically to the cleaning solution to form a heterogeneous or homogeneous mixture with the constituted cleaning agents. The additives may act either as cleaning additives themselves, reactants or precursors that produce cleaning agents or surfactants when exposed to ozone, oxidation catalysts, wetting agents, and emulsifiers to improve the performance of the regenerated cleaning solution. The additives may be very specialized surfactants, wetting agents or emulsifiers or they may be raw waste materials such as used antifreeze, used mineral spirits, used crankcase motor oil, used transmission fluids, used hydraulic fluids, and bio-organic compounds selected from the group consisting of fatty acids, carbohydrates, proteins, and amino acids. Such additives act as organic feed stock to the reactor and are converted into useful surfactants, wetting agents and emulsifiers. Such additives may be necessary in some cleaning systems where the ratio of organic contaminants to inorganic contaminants is too low or where the ratio has changed and the system has not yet been balanced to compensate for the new ratio.

Depending upon the chemical composition of the contaminated cleaning solution and the types of additives, it is possible to chemically combine the additives with the organic contaminants in the contaminated cleaning solution and increase the yield and/or strength of the cleaning agents and to form new cleaning agents upon exposure to the ozone containing gas. For example, with the oxidation process described above, it is possible to produce a variety of new cleaning agents including the alkali metal salts of acetic acid, formic acid, glycolic acid, tartaric acid, ketones, ethers, aldehydes, carboxilic acids, alcohols, and hydroxy and alkoxy groups.

Cleaners containing in excess of 95% organics and less than 5% water have been successfully produced by the present process and repeatedly reused. Solutions containing in excess of 99% water at both acid and highly alkaline pH's have also been successfully processed and repeatedly reused. Moreover, there does not appear to be a practical limit to the number of times the cleaner can be processed and reused.

EXAMPLE 1

The process illustrated in FIG. 1 has been tested on an automotive spray washer that is used to clean engine blocks and heads prior to their being remanufactured. In a recent test a completely exhausted 60 gallon cleaning bath, 1 year old, was restored to 80% of the performance of the original cleaning bath in less than 8 hours of processing. In a second test, 4 gallons of motor oil were introduced into the same 60 gallon cleaning bath. The cleaning solution and oil mixture was then processed for 16 additional hours. Ozone was produced using a corona discharge ozone generator fed by a pressure swing adsorption oxygen concentrator. An electric sealess centrifugal pump was used to pump the cleaning solution.

The cleaner was heated and operated at 140° F. and 200° F. The cleaning solution was fed through the nozzles at 60 pounds of pressure by a 5 HP pump. Since the cleaner was heated, a great deal of water was lost to evaporation. The rinse water was reused as make up water to replace the water lost to evaporation.

Ozone was fed at the rate of approximately 13 grams of ozone per hour and at a concentration of approximately 2 grams of ozone per 100 grams of ozone containing gas for a period of approximately 16 hours. The previously unusable cleaner was now cleaning parts at about half the speed of a new uncontaminated cleaner. The pH of the contaminated cleaning solution had fallen from 9 to 8 and was later raised from 8 back up to 13. A new uncontaminated cleaner initially has a pH of 12.5 to 13. The pH of the cleaner was raised by adding inorganic alkali metal salts, such as sodium hydroxide and sodium phosphate to restore the cleaner to its normal operating pH range.

The increase in the pH allowed carboxylic acid functional groups previously created by the partial oxidation of hydrocarbon contaminants to go through a rapid acid/base neutralization reaction, thus forming the more water soluble alkali metal salts of the carboxylic acids. At this point, the previously unusable cleaner was cleaning at 80% of the speed of a new uncontaminated cleaner. This effect was not seen when the unusable cleaner was only treated with metal alkali salts.

The cleaner was then used for a period of 8 weeks without any further loss of performance. At the end of the 8 week period, the 60 gallon cleaner bath was mixed with 4 gallons of well-used motor oil from a gasoline engine crankcase. The oil/cleaner mixture formed two distinct phases. The mixture was then fed ozone at the same rate as before for 44 hours. The two-phase mixture formed a stable emulsion that cleaned parts twice as fast as a new uncontaminated cleaner. Although the emulsion would break if heated without agitation, it was stable a room temperature for several hours before forming three distinct phases.

Careful evaluation revealed that partial oxidation of the motor oil had generated enough oxygenated water soluble synthetic surfactants to increase the cleaning performance far beyond the capability of the original cleaner. The recycled cleaning bath was performing 100% better than the new original formulation. In effect, the process produced a superior cleaning solution from a dead, unusable cleaning bath that was loaded with grease and oil. Furthermore, the previously unusable cleaner was converted into an excellent cold cleaning solution.

The economics of the process are based on the following cleaning system cost reductions: (1) water is reused; (2) the used cleaner is regenerated and reused, thus, the need to purchase replacement cleaning chemicals is eliminated; (3) waste disposal costs are eliminated; (4) since the cleaning performance is improved, resulting in reduced cleaning cycle residence times, and does not decline with use, and considering the improved cleaning performance when compared to standard purchased formulas, the cost of power and fuel to operate the present cleaning process can be reduced by 50% to 90%; and, (5) the cleaning system can be operated at lower temperatures, further reducing operating costs. It has been found that the recycled regenerated cleaning solution is capable of cleaning at temperatures as low as 70° F.

It should be understood that the cleaning process vessel, such as a batch spray washer, may also serve as the oxidation reactor vessel. For new cleaning system designs this would result in a considerable savings for the purchaser of new cleaning systems by eliminating the expense of an additional vessel and the associated circulation pumps and plumbing.

Figure 3:
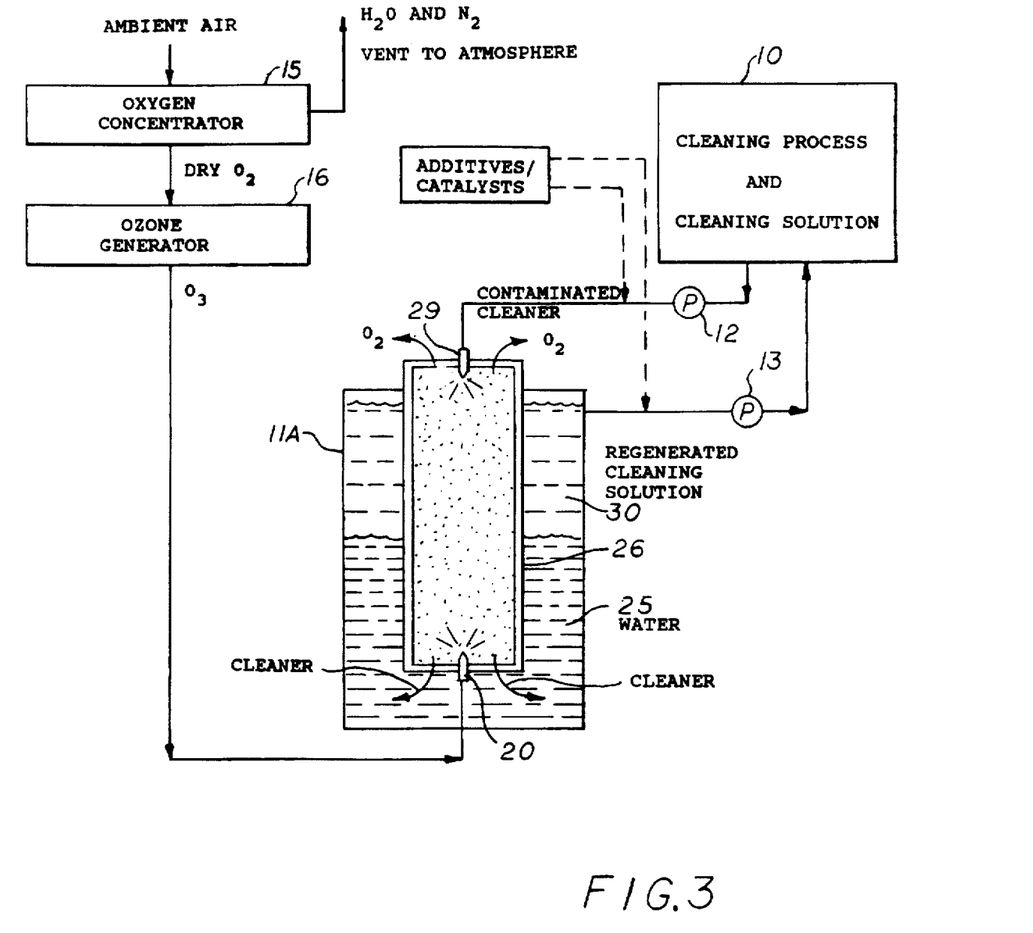
FIG. 3 is a flow diagram of a closed loop oxidation reaction process for converting used contaminated solvent-based cleaning solutions into regenerated reusable cleaning solutions in accordance with the present invention.

Referring now to FIG. 3, there is shown an oxidation reaction process in accordance with the present invention for regeneration of used contaminated solvent-based cleaning solutions such as single-phase cleaning solutions, multiphase cleaning solutions, emulsion cleaning solutions, and solutions containing a solid abrasive phase, for example, an organic single-phase cleaner such as mineral spirits.

In this embodiment, the oxidation reaction vessel 11 contains a volume of water 25 at a lower end and has an apertured tubular mixing member 26 which extends into the volume of water. The tubular mixing member 26 is filled with a packed bed 27 of inert or catalytic media, such as random, structured, ceramic and/or plastic tower packing such as that used in commercial distillation or stripping tower installations, with or without catalytic oxidation metals or metal oxides loaded on the media surface. Such metals may include the transition metals iron, copper, chromium, nickel, palladium, platinum, silver, and the metal oxides iron, copper, nickel, chromium, molybdenum, manganese, and vanadium. Ozone is injected into the bottom of the packed bed 17 while the contaminated organic cleaner from an original cleaning process 10 is pumped into the top of the packed bed.

The contaminated cleaning solution is transported by a pump 12 from the original cleaning process 10 and the regenerated cleaning solution is transported back to the cleaning process 10 either by gravity flow or by a pump 13.

An oxygen concentrator 15 having a compressor is connected to an ozone generator 16. Oxygen is drawn from ambient air and concentrated in the oxygen concentrator 15 and is passed through the ozone generator 16 where a portion of the oxygen gas is converted into an ozone containing gas. In a preferred embodiment the ozone containing gas is produced in small quantities for small cleaning systems with an ultraviolet light ozone generator where ambient air is drawn through the ozone generator and some of the oxygen in the ambient air is converted to ozone.

Alternatively, the ozone generator 16 may be a corona discharge ozone generator capable of producing larger quantities of ozone more efficiently than with ultraviolet light. A corona discharge ozone generator when fed with concentrated dry oxygen produces proportionally larger quantities of ozone at higher concentrations. The corona discharge ozone generator embodiment would include the use of a pressure swing adsorption oxygen concentrator to produce and supply concentrated dry oxygen to the corona discharge ozone generator.

The ozone containing gas is discharged at about 2 to about 8 psig from the ozone generator 16 and injected through a nozzle 20 at the bottom of the mixing member 26 and passes upwardly through the packed bed 27 in the water layer 25, while the contaminated cleaning solution is injected through a nozzle 29 at the top of the mixing member and passes downwardly through the packed bed.

Intense mixing occurs in the packed bed 27 of the mixing member 26. Flow and separation are driven by the differences in density between the water phase, organic solvent phase, and ozone containing gas phase. The water 25 serves as both a reactant and as a coolant to insure the safe operation of the reactor thus avoiding any explosion hazards. The regenerated cleaning solution passes through the apertures of the mixing member 26 and forms a layer of regenerated cleaning solution 30 on top of the water layer 25. The regenerated cleaning solution may then be transported back to the cleaning process 10 either by gravity flow or by a pump 13.

The total amount of ozone used is dependent upon the amount and type of contaminate in the cleaner. As previously described, solution additives may be used to compensate for variations in the amount of contaminate loading on the original cleaning system, variations in the original cleaning solution formula, and for variations in the chemistry of the contaminants themselves. Additives, oxidation catalysts, and selective catalysts which increase the yield of desired cleaning agents while reducing the amount of ozone required to produce the cleaning agents, may also be added periodically to the cleaning solution.

EXAMPLE 2

The process illustrated in FIG. 3 has been tested on various formulas of contaminated petroleum based solvents. The generic names of the solvents tested were Diesel π4 and π2, Mineral Spirits, and Stoddard. The contaminated cleaning solvents were previously used as cleaners in a sink type cleaning operation (hand scrubber) and were used to clean parts varying from mild steel to non-ferrous metals. The testing was carried out at ambient temperature. A 30 gallon vessel containing approximately 3 gallons of water was used as the mixing chamber. No packing was used. Ozone was injected into the bottom of the vessel and approximately 22 gallons of contaminated solvent was introduced through the top of the vessel. Various contaminated solvents were tested.

It was observed that the pH of all the solvents were lowered by about 1.0 and that separation of the suspended solids using filters and gravity was greatly enhanced. Gravity separation proved to be very efficient. The solvents seemed not to want to hold solids at all. The regenerated cleaning solutions were found to have a cleaning strength at least as great as, or surpassing, the strength of the original cleaning solution prior to contamination. The regenerated solvents were harsh on the hands, but the addition of a small amount of lanolin overcame the skin irritation problem. should be understood that the process described with reference to FIG. 3, may be extended to emulsion cleaners as well as other multi-phase cleaners containing as many as three liquid phases as well as a solid abrasive phase, such as those used in wet blast cleaning operations.

While this invention has been described fully and completely with special emphasis upon preferred embodiments, it should be understood that within the scope of the appended claims the invention may be practiced otherwise than as specifically described herein.

We claim:

1. An oxidation process for regeneration of a contaminated cleaning solution to convert the contaminated cleaning solution into a reusable regenerated cleaning solution containing new useful cleaning agents including surfactants, detergents, wetting agents and emulsifiers that are formed by said process, comprising the steps of:

mixing a contaminated cleaning solution containing inactive organic and inorganic contaminants selected from the group consisting of water, organic solvents, surfactants, ionic salts, fats, oils, and greases with an ozone containing gas containing a stoichiometric amount of ozone sufficient to partially oxidize the inactive organic contaminants in said contaminated cleaning solution and convert them into new useful active cleaning agents, polar water soluble surfactants, detergents, wetting agents and emulsifiers which reduce the surface tension of said contaminated cleaning solution;

said amount of ozone being insufficient to sterilize, purify, or totally destroy all of the organic contaminants in said contaminated cleaning solution; and said reusable regenerated cleaning solution has a cleaning strength at least as great as the strength of the original cleaning solution prior to contamination.

2. The process according to claim 1 wherein said contaminated cleaning solution has a pH in the range of from about 2 to about 13 prior to processing and said amount of ozone is sufficient to produce a reusable regenerated cleaning solution having a cleaning strength of at least as great as the strength of the original cleaning solution prior to contamination.

3. The process according to claim 1 wherein said contaminated cleaning solution is mixed with said ozone containing gas to produce a stoichiometric ratio of organic carbon contaminant to ozone of from about 300:1 to about 10:1.

4. The process according to claim 1 wherein said contaminated cleaning solution is first premixed with said ozone containing gas and the mixture is then injected into a reaction vessel and the reaction of said ozone containing gas is carried out in a mixed liquid/vapor state in the form of a gas/liquid mist and at ambient temperature.

5. The process according to claim 1 including the step of heating said contaminated cleaning solution prior to mixing said contaminated cleaning solution with said ozone containing gas.

6. The process according to claim 5 including the step of atomizing said heated contaminated cleaning solution into a vapor after mixing said contaminated cleaning solution with said ozone containing gas.

7. The process according to claim 1 including the step of adding oxidation catalysts to said contaminated cleaning solution;

said oxidation catalysts selected from the group consisting of selective oxidation catalysts, catalytic oxidation metals, metal oxides, and transition metals.

8. The process according to claim 1 including the step of adding organic carbon compounds to said contaminated cleaning solution prior to mixing said contaminated cleaning solution with said ozone containing gas;

said organic carbon compounds being added in an amount sufficient to chemically combine with said organic contaminants in said contaminated cleaning solution forming new cleaning agents upon mixing and reacting with said ozone containing gas.

9. The process according to claim 8 wherein said organic carbon compounds are selected from the group consisting of used organic carbon compounds, used antifreeze, used mineral spirits, used motor oil, used transmission fluids, used hydraulic fluids, and bio-organic compounds selected from the group consisting of fatty acids, carbohydrates, proteins, and amino acids.

10. The process according to claim 8 wherein said organic carbon compounds when mixed with said organic contaminants in said contaminated cleaning solution and reacted with said ozone containing gas form new cleaning agents selected from the group consisting of the alkali metal salts of acetic acid, formic acid, glycolic acid, tartaric acid, ketones, ethers, aldehydes, carboxylic acids, alcohols, hydroxy groups, and alkoxy groups.

11. The process according to claim 1 including the step of after converting said contaminated cleaning solution into a reusable regenerated cleaning solution;

utilizing said reusable regenerated cleaning solution as the cleaning solution in the original cleaning process from which the contaminated cleaning solution was obtained.

12. The process according to claim 11 including the steps of after utilizing said reusable regenerated cleaning solution as the cleaning solution in said original cleaning process;

rinsing said reusable regenerated cleaning solution with a rinse water to form a rinse water contaminated with said reusable regenerated cleaning solution and collecting said contaminated rinse water; and physically separating said reusable regenerated cleaning solution from said contaminated rinse water.

13. The process according to claim 12 including the steps of utilizing clean rinse water separated from said contaminated rinse water as a rinse water in said original cleaning process; and utilizing said reusable regenerated cleaning solution separated from said contaminated rinse water as the cleaning solution in said original cleaning process.

14. The process according to claim 12 wherein said step of physically separating said contaminated rinse water is accomplished by a process selected from the group consisting of reverse osmosis filtration, nano-filtration, and ultra-filtration.

15. The process according to claim 1 wherein said contaminated cleaning solution is an organic cleaning solution selected from the group consisting of single-phase solvent-based and water-based cleaning solutions, multi-phase solvent-based and water-based cleaning solutions, emulsion solvent-based and water-based cleaning solutions, and solvent-based and water-based cleaning solutions containing a solid abrasive phase;

said step of mixing is carried out in a reaction vessel containing a packed bed of material selected from the group consisting of inert and catalytic material partially submerged in a volume of water;

said step of mixing is accomplished by simultaneously injecting said contaminated cleaning solution and said ozone containing gas into said packed bed to cause intense mixing of said contaminated cleaning solution, said ozone containing gas, and said water, sufficient to partially oxidize the inactive organic contaminants in said contaminated cleaning solution and convert them into new useful active cleaning agents, polar water soluble surfactants, detergents, wetting agents and emulsifiers which reduce the surface tension of said contaminated cleaning solution; and physically separating said mixture into a water phase and a regenerated organic cleaner phase.

16. The process according to claim 15 wherein said packed bed of material is selected from the group consisting ceramic and plastic materials.

17. The process according to claim 15 wherein said packed bed of material is selected from the group consisting ceramic materials, plastic materials, catalytic oxidation metals, catalytic oxidation metal oxides, and transition metals.

\* \* \* \* \*